United States Patent [19]
Roeder

[11] 3,937,891
[45] Feb. 10, 1976

[54] BURGLAR ALARM

[76] Inventor: George K. Roeder, P.O. Box 4335, Odessa, Tex. 79760

[22] Filed: Sept. 16, 1974

[21] Appl. No.: 506,439

[52] U.S. Cl. ................................................ 179/5 R
[51] Int. Cl.² ....................................... H04M 11/04
[58] Field of Search........... 179/5 R, 5 P, 2 A, 90 B; 340/416, 274

[56] References Cited
UNITED STATES PATENTS

| | | | |
|---|---|---|---|
| 2,768,239 | 10/1956 | Foster et al. ......................... | 179/5 P |
| 3,105,121 | 9/1963 | Field .................................. | 179/5 R |
| 3,327,060 | 6/1967 | Hogan ................................. | 179/5 R |
| 3,510,593 | 5/1970 | Chappell ............................. | 179/5 R |
| 3,518,655 | 6/1970 | Saul .................................... | 340/274 |
| 3,546,382 | 12/1970 | Embury ............................... | 179/5 R |

Primary Examiner—Douglas W. Olms
Attorney, Agent, or Firm—Marcus L. Bates

[57] ABSTRACT

An alarm system having means by which unauthorized entrance into an enclosure activates mechanical apparatus which dials a second telephone from a first telephone, thereby informing whomever might be present at the second telephone that a particular location is being burglarized.

3 Claims, 5 Drawing Figures

BURGLAR ALARM

BACKGROUND OF THE INVENTION

The progressive breakdown of law and order in the United States has caused an alarming increase in the crime rate. Criminals and dangerous intruders continue to break and enter buildings and other enclosures, with the intent of unlawfully converting the owner's property into their own illigitimate and devious use. These robbers loot and plunder and maliciously destroy a substantial amount of the national wealth each year. Often these thieves are caught after they have left the robbed premises and following the act of converting stolen property into cash. Hence it is difficult for the victim to provide law enforcement officers with the excessive high degree of proof required for the courts to punish and discourage the trespasser. Therefore, it is desirable that one be able to provide his premises with an inexpensive signal device by which anyone can be telephoned and advised that his premises are being burglarized. Moreover, it is desirable to be able to attain this attribute by using standard equipment available from most electrical hardware stores. Furthermore, it is desirable that such an expedient be simple to install in a small amount of time, and to be foolproof and reliable.

SUMMARY OF THE INVENTION

This invention relates to an alarm system having means by which unauthorized entrance into an enclosure activates mechanical apparatus which dials a second telephone from a first telephone, thereby informing whomever might be present at the second telephone that a particular location is being burglarized. More Specifically, the apparatus comprises a plurality of switches actuated by movement of a closure member leading into the enclosure, with the switches deactivating a relay, which actuates a motor driven cam means. The cam is arranged to rotate into contact with and move a switch button located on an automatic dialing apparatus. The dialing apparatus is arranged to connect the first telephone to any desirable second telephone.

Accordingly, a primary object of the present invention is the provision of a mechanical apparatus which causes a first telephone to dial a second telephone in response to unauthorized entrance into an enclosure.

A primary object of the present invention is the provision of simple, inexpensive electrical and mechanical apparatus arranged into the form of a burglar alarm.

Another object of the invention is to provide switch actuated apparatus connected to various closure means associated with an enclosure so that unauthorized entrance thereinto causes an automatic dial device connected to a first telephone to dial a second telephone.

The above objects are attained by the provision of a plurality of switches series connected to a solenoid actuated relay which energizes a motor-driven cam with the cam being arranged to actuate automatic dialing apparatus so that energization thereof causes a first telephone to dial a second telephone.

DETAILED DESCRIPTION OF THE PREFERRED EMBODIMENT

Figure 1:
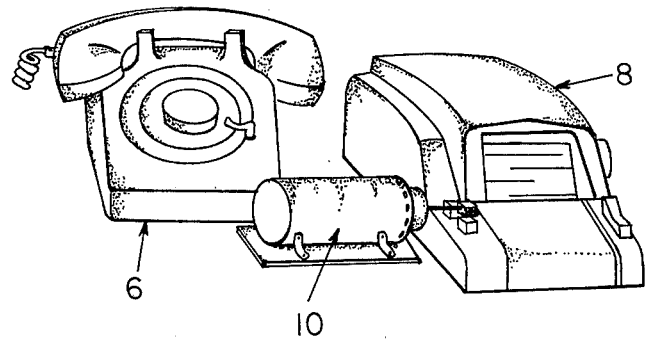
FIG. 1 is a perspective view of one arrangement of apparatus made in accordance with the present invention.

In FIG. 1, the numeral 6 indicates an ordinary dial-type telephone having connected thereto means 8, representative of an automatic dialing apparatus, by which any predetermined telephone number can be called by merely energizing the apparatus in a well-known manner.

Numeral 10 indicates a motor-driven, cam-actuated assembly for engaging and depressing one of the switch means associated with the automatic dialing apparatus.

Figure 2:
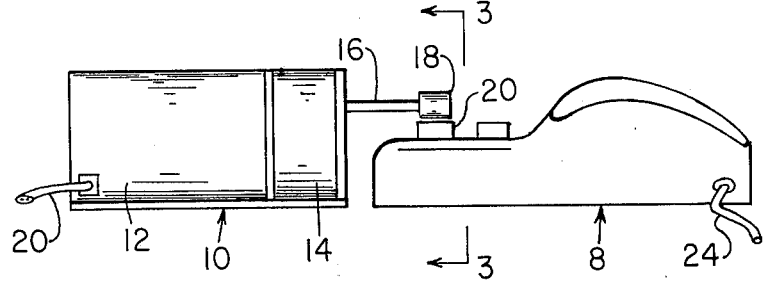
FIG. 2 is an enlarged, side elevational view of part of the apparatus disclosed in FIG. 1, with the apparatus being somewhat rearranged.

As seen in FIG. 2, in conjunction with some of the remaining figures, the motor-driven cam device comprises an induction motor 12, having a reduction gear assembly 14 connected thereto for rotatably driving a shaft 16. The shaft has a cam 18 affixed to the free depending end thereof. Electrical conduit 20' provides a suitable source of current for the motor, as for example, 110 v. AC.

The device is connected into the first telephone by electrical circuitry, part of which is disclosed at 24.

Figure 3:
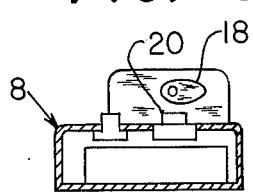
FIG. 3 is a reduced, part cross-sectional view taken along line 3—3 of FIG. 2.
Figure 4:
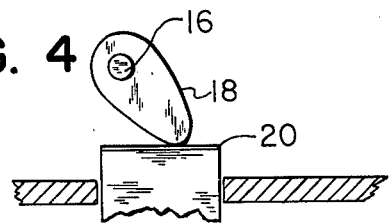
FIG. 4 is an enlarged, fragmentary, part cross-sectional representation of part of the apparatus disclosed in the foregoing figures; and, FIG. 5 is a part diagrammatical, part schematical representation of circuitry, which forms one embodiment used in carrying out the present invention.

As seen illustrated in FIGS. 3 and 4, together with FIGS. 1 and 2, the cam is seen to be positioned in superimposed relationship respective to a call switch 20 so that as the cam is rotated by the shaft of the motor-driven gear reducer, it engages and depresses the call switch, thereby actuating the automatic dialing apparatus.

Figure 5:
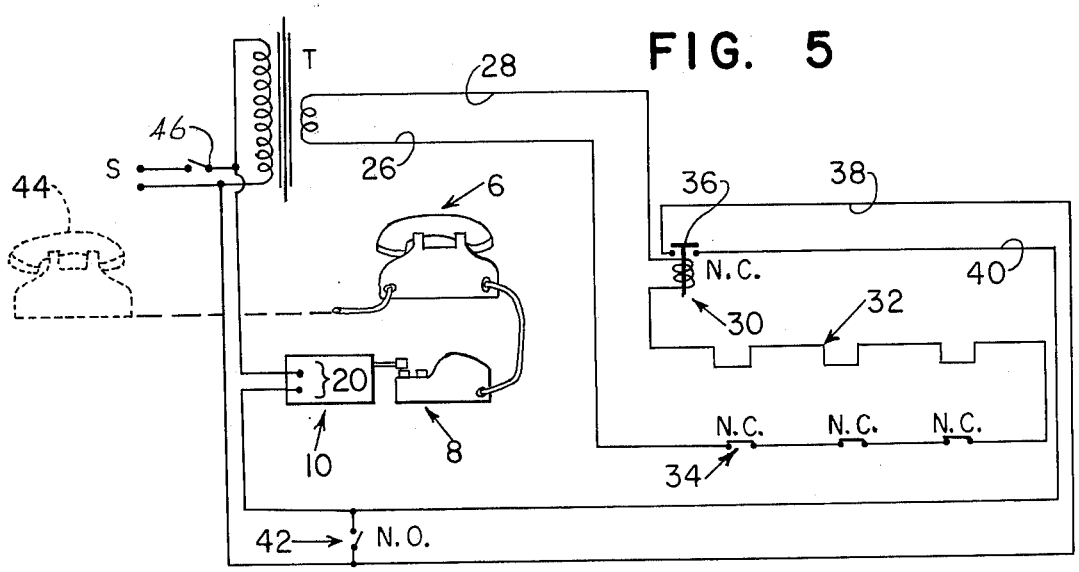

In the illustration of FIG. 5, the primary winding of a transformer T is connected to line voltage S with the illustrated switch being interposed therebetween for disconnecting the entire circuitry therefrom. The secondary of the transformer is connected by lines 26 and 28 to the low voltage part of the circuitry, which includes a solenoid-actuated normally closed switch assembly 30, a first switch means which includes a plurality of conducting elements 32 and a plurality of normally closed switches 34.

Solenoid-actuated switch 36 is series connected by electrical lines 38 and 40 to the primary of the transformer and to the motor 10. A normally opened switch 42 enables the motor 10 to be actuated for purposes of test at any time by short-circuiting legs 38 and 40 of circuitry.

Elements 32 preferably are small strips of foil attached to windows and the like in a serpentine manner so that when the glass thereof is moved, as by breakage, the normally closed circuitry comprised of the series connected strips of foil will cease to conduct electricity.

The normally closed switches 34 are connected to be moved to the open position by a closure means associated with an enclosure means, as for example, closed doors and the like. When one of the doors are opened, one of the series connected normally closed switches associated therewith will be moved to the open position, thereby preventing current flow through the two legs 26 and 28.

The motor 12 is a low torque stall proof motor connected to a 450:1 gear reducer so that the cam is rotated 4 rpm. This arrangement causes the apparatus 8 to dial the second telephone 44 each 15 seconds.

The automatic dialing apparatus 8 is available from Bell Telephone Co. and is referred to as a "Magicall". The apparatus is programmed with a multiplicity of predetermined telephone numbers, each being indexed with indicia appearing in the illustrated viewing window. Any selected number will be automatically dialed when the call button is depressed.

The apparatus is placed into operation by programming the device so that a selected telephone number will alert a person at a second telephone 44. It is preferable that the second person at 44 be knowledgeable of the burglar alarm system, or it will otherwise be necessary to send a transcribed message to the listener at the second telephone 44, in order to appraise him of the unlawful act which is being carried out at that moment.

The cam is superimposed above call switch 20 in illustrated manner of FIGS. 1–4, with the cam normally being disengaged from the switch in the illustrated manner of FIG. 2 and 3. The foil strips 32 are each series connected together, and to the series connected door switches so that a current flow path is formed through the series connected foils, switches, transformer and the solenoid. The first telephone receiver is lifted from the telephone base, and switch 46 is then closed to energize the transformer T with a suitable source of current, as for example, 110 volts AC. The apparatus is now in the standby configuration.

Prior to lifting the telephone from its cradle, it is advantageous to close switch 42 for a few seconds while observing the cam as it makes one revolution, thereby depressing the call switch for test purposes.

When the operator must exit through one of the doors 34, it is advantageous that the switch 46 be actuated by a lock having a key therefor so that the switch can be opened or closed from without the enclosure.

The present apparatus provides a foolproof burglar alarm system which is low in cost, easy to assemble, and foolproof in operation. For example, should one program the device 8 to telephone his home, and should a burglar intrude into his enclosure, one of the elements 32, 34 would open, causing the solenoid 30 to become de-energized, thereby closing switch 36, which in turn energizes motor 12, causing cam 18 to close switch 20, thereby dialing the telephone 44. After the telephone 44 rings, cam 18 continues to engage switch 20 each 15 seconds. This action continually dials the telephone 44 with the listener therof hearing the "clicks" as the number is dialed over and over again. This action assures the listener that his alarm device has been actuated and he should immediately telephone the proper authorities and apprise them of the situation.

The "Magicall" is a Bell System Dialer Unit, manufactured by DASA Corporation, Andover, Mass., U.S.A., for Western Electric.

I claim:

1. An alarm system by which unauthorized entrance through a closure means into an enclosure causes a first telephone to dial a second telephone comprising:

a first switch means (34) for connection to a closure means so that movement of the closure means activates said first switch means;

a motor-driven switch actuator (10), a first telephone (6), a second telephone (44), means forming an automatic dialing apparatus by which a predetermined telephone number can be dialed;

circuit means connecting said automatic dialing apparatus to said first telephone; means, including a call switch on said automatic dialing apparatus, by which said first telephone will dial said second telephone when said call switch is activated;

circuit means connected to said first switch means for causing said motor of said motor-driven switch actuator to be energized upon movement of the closure means to which said first switch is connected;

means by which said motor-driven switch actuator is positioned respective to said automatic dialing apparatus so that said call switch is actuated when said motor-driven switch actuator is energized;

said motor-driven switch actuator being a motor-driven reduction gear assembly having an output shaft, a cam affixed to said shaft, said cam being arranged respective to said motor-driven reduction gear assembly, shaft and call switch, so that rotation of said shaft causes said cam to engage and actuate said call switch.

2. The alarm system of claim 1, wherein said first switch means is a plurality of series connected normally closed switches, with one switch being arranged relative to the closure means so that when the closure means is opened, the switch is moved to the open position.

3. The alarm system of claim 2, and further including a solenoid actuated normally closed switch; a step-down transformer; said first switch means being series connected to said transformer and said solenoid; said transformer being connected to a source of current;

said normally closed switch of said solenoid actuated normally closed switch being series connected to said motor and to a source of current;

so that when said first switch means is moved to the opened position, said solenoid is de-energized, and the normally closed contacts thereof assume the closed position, causing said motor to be actuated, which in turn actuates said call switch, whereupon the first telephone dials the second telephone, thereby indicating that a closure means has been moved.

* * * * *